United States Patent [19]

Feldle et al.

[11] 4,209,721
[45] Jun. 24, 1980

[54] EXTERNAL ROTOR MOTOR

[75] Inventors: Kurt Feldle, Würzburg; Reiner Schönberger, Freiburg-Landwasser, both of Fed. Rep. of Germany

[73] Assignee: SKF Kugellagerfabriken GmbH, Schweinfurt, Fed. Rep. of Germany

[21] Appl. No.: 919,167

[22] Filed: Jun. 26, 1978

Related U.S. Application Data

[63] Continuation of Ser. No. 793,603, May 4, 1977, abandoned.

[30] Foreign Application Priority Data

May 4, 1976 [DE] Fed. Rep. of Germany ... 7614054[U]

[51] Int. Cl.² ............................................. H02K 5/16
[52] U.S. Cl. ...................................... 310/67 R; 310/90
[58] Field of Search .............................. 310/67, 90, 42

[56] References Cited

U.S. PATENT DOCUMENTS

| 1,780,339 | 11/1930 | Canton | 310/67 UX |
| 3,002,118 | 9/1961 | Papst | 310/67 X |
| 3,107,946 | 10/1963 | Drake | 310/90 UX |
| 3,596,122 | 7/1971 | Stewart | 310/67 |
| 3,742,267 | 6/1973 | Papst et al. | 310/67 |
| 3,822,602 | 7/1974 | Holmes et al. | 310/67 X |

*Primary Examiner*—Donovan F. Duggan
*Attorney, Agent, or Firm*—Daniel M. Rosen

[57] ABSTRACT

An electric motor having an external rotor, an armature shaft passing therethrough, and an internal stator surrounding the armature. The armature is coupled to the stator by a rolling bearing. The improvement comprises the bearing as a double-rowed radial bearing having a common outer ring within the bore of the stator, first and second races, spaced from one another and adapted to receive first and second rows of rolling elements, and first and second inner races worked directly into the armature shaft.

8 Claims, 1 Drawing Figure

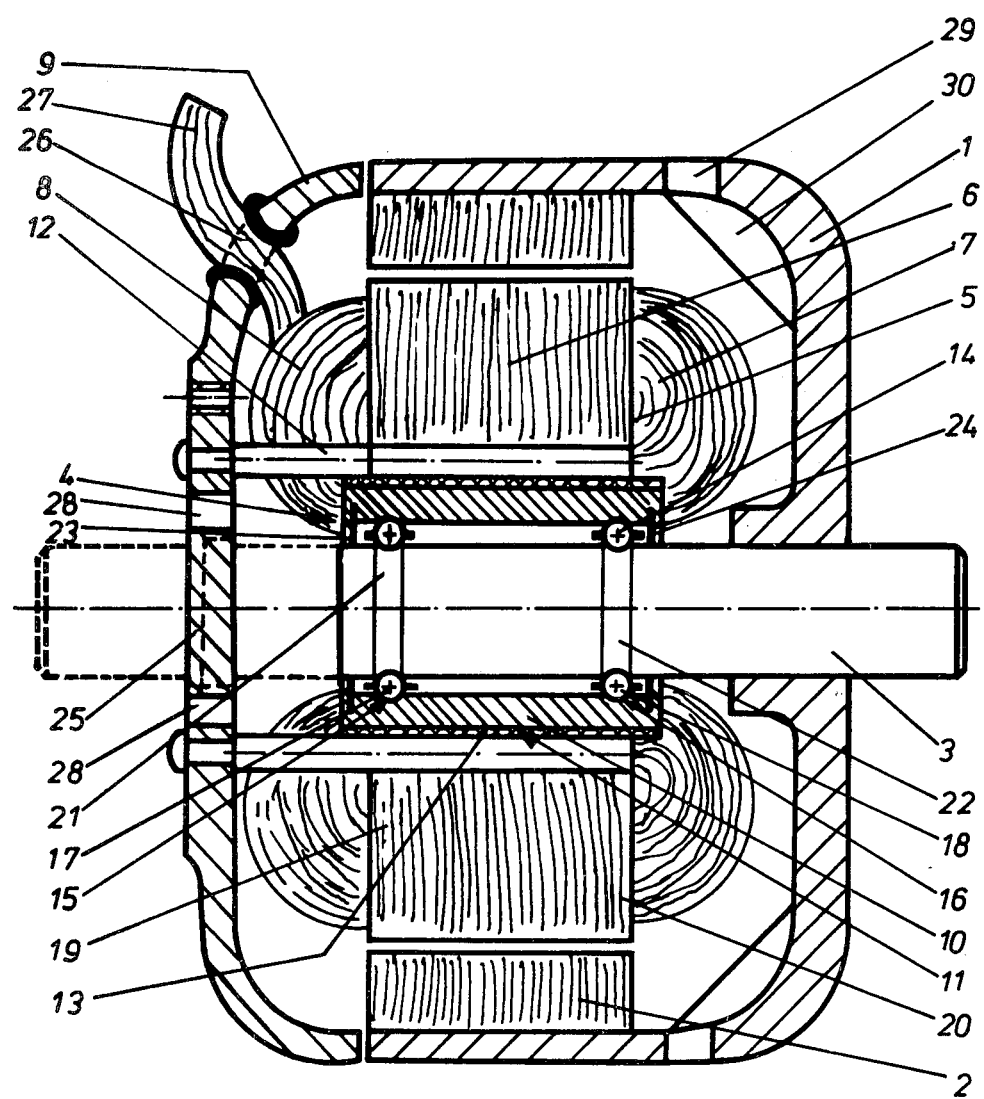

EXTERNAL ROTOR MOTOR

This is a continuation of application Ser. No. 793,603, filed May 4, 1977, now abandoned.

The invention relates to external rotor motors, and particularly to an electrical motor of the external rotor type, where the bell-shaped external rotor overlaps the internal stator and is supported in a borehole of the internal stator with the armature shaft above the rolling bearing.

Electric motors of the external rotor type are known. In such motors, a receiving component is fastened in the internal stator. This receiving component, hereinafter termed a bearing cage or bearing tube, serves to take up the friction-reducing or rolling bearings supporting the armature shaft and to fasten the motor to the motor support.

In a known construction of an electric motor with external rotor (German Patent 1,291,824), a relatively thick-walled bearing cage is fastened in the middle borehole of the internal stator. This known bearing cage is fashioned at its two ends with special seatings, which are displaced radially outwards, each of which takes up a deep-grooved ball bearing for supporting the armature shatft. Moreover, one end of the bearing cage is provided with additional crosspieces for fastening the motor to the motor support.

In a further known construction of a motor of the external rotor type (German Utility Pat. No. 7,213,003), the internal stator is fastened on a bearing tube. In the borehole of the bearing tube, two friction bearings are pressed for supporting the armature shaft, the friction bearings being inserted in asymmetrical arrangement to the internal stator. At the end facing the attachment side, the bearing tube is connected with an auxiliary flange, embedded in a light-metal flange, and used for securing the motor. In this known construction, special means must be provided at the end of the armature shaft in order to prevent an axial displacement of the armature shaft.

In these known constructions, the bearing cage or bearing tube, together with the appropriate bearings for the armature shaft, form parts that are complicated and therefore expensive to manufacture. In addition, they may form several parts that must be manufactured in several operations and put together in several assembly processes.

It is therefore the prime object of the present invention to provide an electric motor of the external rotor type which, including the support, includes fewer parts, thereby saving space, and for which the internal stator and the armature shaft interact in a simple manner. The design of the individual parts should be simple and their manufacture should be possible without great effort. Moreover, these parts desirably form a unit in which satisfactory centering of the revolving armature shaft with the bell-shaped external rotor is achieved relative to the internal stator without requiring additional parts.

In order to accomplish the foregoing object in accordance with the present invention, a double-rowed radial bearing is provided with a common outer ring carrying, within its diameter and at a distance from one another, two outer races for the two rows of ball bearings. The inner races of the bearings are worked directly into the armature shaft, whereby the outer ring is arranged within the bore of the internal stator.

Not only is the number of individual parts thereby reduced by the foregoing inventive construction, but the radial and axial constructed height of the electric motor is additionally decreased. Thus, a savings in weight of the overall motor of the external rotor type is achieved.

According to a further characteristic of the invention, the casing of the outer ring has a surface which is roughened, or provided with grooves, furrows, or the like. With this construction, it is possible to connect the outer ring as a secure support, solidly to the lamination of the internal stator, whereby a complete assembly part is obtained.

In an advantageous further development of the invention, a thin-walled elastic, vibration damping insulating sheath, which covers the whole of the casing surface of the outer ring, can be mounted between the outer ring and the inner bore of the lamination. This embodiment is particularly advantageous when the elastic insulating sheath is used for damping and therefore for quiet operation.

For the purpose of simple construction and economic manufacture, it is advantageous to cast or glue the outer ring into the bore of the internal stator. By these means, the assembly of the motor of the external rotor type is improved significantly.

According to a further characteristic of the invention the assembly process may be simplified by equipping the lamination, which is fastened to the casing surface of the outer ring and which is fashioned as a unit, with connectors such as pins or the like, which protrude from one side of the internal stator and to which the pot-shaped fastening element is attached.

The foregoing brief description will become more apparent from the following more detailed description and appended drawing.

An electric motor of the external rotor type is shown in cross-section in the sole figure. It includes essentially the bell-shaped external rotor 1 with the rotor lamination 2 mounted in its bore, the armature shaft 3, and the double-rowed radial ball bearing 4. Also included are the internal stator 5 with lamination 6 fastened on this bearing, the stator winding with the coil-winding heads 7 and 8 and the pot-shaped fastening element 9.

The one-piece outer ring 10 of the double-rowed radial ball bearing 4 can be fastened directly in the inner bore of the lamination 7 of the internal stator. For this connection, it is not necessary to process the casing surface 11 of the outer ring 10 in any special way; it is even advantageous if this surface is rough. In order to achieve good fixation, the roughening can take the form of providing the casing surface 11 with grooves, furrows or any design suitable good adhesion. The outer ring 10 and the lamination 6 can be connected with one another in such a way that the lamination 6 with the inner bore is pressed, glued or the like onto the casing surface 11 of the one-piece outer ring 10. In so doing it is advantageous to fashion the lamination 6 as a unit and to provide connectors such as pins 12 or the like, which are so arranged that they protrude from one side of the laminations 6 of the internal stator 5. The outer ring 10 is arranged in the laminations 6 so that it projects from it equally on both sides.

In the example shown, a thin-walled, elastic, vibration-damping insulation sheath 13 of plastic or the like, is provided between the outer ring 10 and the lamination 6. This insulating sheath 13, which covers the whole of the casing surface 11, can also be pressed on, glued on or the like. Moreover, it is also possible to form this insulating sheath 13 by an injection-molding process or the like, whereby the outer ring 10 and the lamination 6 are connected to one another in one processing step, so that these pieces form an already assembled part. Outer races 15 and 16 receive the ball bearing 14, arranged in cages, and are worked into the bore of the one-piece outer ring 10. At the same time, ball rows 17 and 18 are preferentially arranged in the region of the ends 19 and 20 of the laminations 6. The inner races 21 and 22 for the ball bearings 14, which lie opposite the outer races 15 and 16, are worked into the armature shaft. By these means, axial fixation of the parts, which rotate relative to one another, it achieved. In an advantageous further development, the double-rowed radial ball bearing 4 is provided at the ends with sealing discs 23 and 24, which are mounted in annular slot of the one-piece outer ring 10 and which effectively prevent the entry of dirt and the like into the interior of the bearing and the escape of lubricant.

The pins 12 are permanently fastened to laminations 6, and may be arranged uniformly distributed on the circumference. The pins 12 project from the internal stator 5 on the side facing the external rotor 1, and the pot-shaped fastening component 9 is fastened to the pins 12 as, for example, by rivetting. It is, however, also possible to provide other means of fastening instead of the pins 12. The pot-shaped fastening component 9 which may, for example, be manufactured from light metal, plastic or the like, can be made thin-walled at the center 25 so that the center 25 can easily be drilled out. Alternatively, if manufactured out of plastic, the center 25 may be broken out for a possible lead-through of the armature shaft 3 to the other side. The pot-shaped fastening element furthermore contains a borehole 26, through which the connecting cable 27 for the stator can be passed.

Electric motors of this type have a limited efficiency, depending primarily on the heat that is produced, both in the rotor laminations 2 and in the internal stator 5 and which must be conducted away by suitable means. In order to achieve effective heat removal in accordance with the invention, air entry openings 28 and arranged in the pot-shaped fastening component 9 and air exit openings 29 in the bell-shaped external rotor 1. In order to ensure effective air circulation, the external rotor 1 can be equipped with cross pieces 30, which are arranged such that the external rotor 1 acts as a fan wheel. By means of this construction, air suction can be produced that draws in air through the air inlet openings 28, passes it over the stator winding or rotor laminations 2, and in this manner draws off the heat of the internal stator as well as of the rotor laminations 2, discharging the air through the air outlet openings 29. Accordingly, a better cooling of the electric motor and of the double-row radial ball bearing 4 is achieved and the efficiency is therefore increased. The invention is not limited to the examples shown, but can be altered within the inventive concept in various ways evident to those skilled in the art.

What is claimed is:

1. In an electric motor having an external rotor, an armature shaft passing therethrough, and an internal stator surrounding said armature shaft, said armature shaft being coupled to said stator by a rolling bearing, the improvement wherein said bearing comprises a double-rowed radial bearing having a common outer ring mounted within the bore of said stator, and supportedly held by said stator in a substantially fixed position, first and second outer races formed in said common outer ring, said outer races spaced from one another and adapted to receive first and second rows of rolling elements, and first and second inner races worked directly into said armature shaft.

2. The motor of claim 1, wherein the external surface of said outer ring has a roughened surface.

3. The motor of claim 1, wherein a thin-walled elastic, vibration-damping insulating sheath is arranged between the outer ring and the inner bore of the stator, the sheath covering the whole of the casing surface of the outer ring.

4. The motor of claim 1, wherein said stator includes laminations formed integrally with said stator, and further including connecting means connecting said laminations and protruding on one side of said internal stator.

5. In an electric motor having an external rotor, an armature shaft passing therethrough, an internal stator surrounding said shaft and within said rotor, said rotor being comprised of a stack of transversely extending laminations, and a rolling bearing between said shaft and stator; the improvement wherein said bearing comprises a unitary outer ring with a pair of internal spaced apart outer races, a pair of inner races worked into said shaft, and rolling elements in respective pairs of inner and outer races, whereby a two row bearing is formed, said laminations being fixedly held to said outer ring, a fastening element for said motor axially spaced from said stator, and a plurality of pins extending axially through said laminations for holding said laminations to said fastening element.

6. The motor of claim 5 wherein said laminations are directly held on said outer ring and in contact therewith.

7. The electric motor of claim 5 wherein a layer of a damping material is provided on the outer surface of said outer ring, said laminations directly contacting said damping material.

8. The motor of claim 5 wherein said fastening element comprises a pot-shaped structural element, said stator having electrical windings with electrical connections thereto extending through said fastening element.

* * * * *

UNITED STATES PATENT AND TRADEMARK OFFICE
CERTIFICATE OF CORRECTION

PATENT NO. : 4,209,721
DATED : June 24, 1980
INVENTOR(S) : Kurt Feldle et al

It is certified that error appears in the above-identified patent and that said Letters Patent are hereby corrected as shown below:

Column 2, line 47, delete "7" and insert --6--.
Column 2, line 53, after "suitable" insert --for--.
Column 3, line 6, delete "bearing" and insert --bearings --.
Column 3, line 17, delte "slot" and insert --slots--.
Column 3, line 56, delete "efficience" and insert --efficiency--
Column 4, line 32, delete "rotor" , second occurrence, and insert -- stator --.

Signed and Sealed this

Ninth Day of December 1980

[SEAL]

Attest:

SIDNEY A. DIAMOND

Attesting Officer

Commissioner of Patents and Trademarks